(12) United States Patent
Kurita

(10) Patent No.: US 6,528,193 B1
(45) Date of Patent: Mar. 4, 2003

(54) FUEL CELL SYSTEM

(75) Inventor: Kenji Kurita, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/510,169

(22) Filed: Feb. 22, 2000

(30) Foreign Application Priority Data

Feb. 22, 1999 (JP) .......................................... 11-043507

(51) Int. Cl.$^7$ .............................. H01M 8/06; H01M 8/04
(52) U.S. Cl. ........................................... 429/20; 429/25
(58) Field of Search ............................... 429/19, 20, 25

(56) References Cited

U.S. PATENT DOCUMENTS

| | | | |
|---|---|---|---|
| 3,982,962 A | * | 9/1976 | Bloomfield |
| 4,696,871 A | * | 9/1987 | Pinto ............................ 429/17 |
| 5,700,595 A | * | 12/1997 | Reiser .......................... 429/13 |
| 6,120,923 A | * | 9/2000 | Van Dine et al. .............. 429/17 |
| 6,162,558 A | * | 12/2000 | Borup et al. ................... 429/19 |

FOREIGN PATENT DOCUMENTS

JP          9-213355          8/1997

* cited by examiner

*Primary Examiner*—Patrick Ryan
*Assistant Examiner*—Jonathan Crepeau
(74) *Attorney, Agent, or Firm*—Oblon, Spivak, McClelland, Maier & Neustadt, P.C.

(57) ABSTRACT

A fuel cell system includes a fuel-cell stack 2 which generates electric power by utilizing a fuel gas and an oxidizing agent gas; a combusting device 3 which burns an off gas of the fuel gas emitted from the fuel-cell stack 2; an oxidizing agent gas supply device 4 including a turbine 41 and a compressor 43. The turbine 41 is rotated by the combustion energy of an exhausted gas from the combusting device 3. The compressor 43 is coupled to the turbine 41 to pressurize the oxidizing agent gas. The oxidizing agent gas supply device 4 is connected to the fuel-cell stack 2 for supplying the pressurized oxidizing agent gas. A reforming device 1 reforms a carbon hydride family fuel into fuel gas and a compressor 51 further pressurizes the pressurized oxidizing agent gas. The compressor 51 is connected between the reforming device 1 and the fuel-cell stack 2.

10 Claims, 2 Drawing Sheets

FUEL CELL SYSTEM

BACKGROUND OF THE INVENTION

1. Field of the Invention

The present invention is directed to a fuel cell system, and in particular to a fuel cell system to be mounted on an automotive vehicle.

2. Description of the Related Art

In general, in fuel cell systems, the consumption ratio of hydrogen contained in a fuel th gas which is supplied to a fuel-cell stack is not 100% but about 80%. Thus an off gas of the fuel gas contains a considerable amount of hydrogen. In the pending United States patent application, filed Jun. 1, 1999 and having Ser. No. 09/323,551 now U.S. Pat. No. 6,306,532, such an off gas is burned in a combustion device and an energy of the resultant exhaust gas is used to drive a turbine. The turbine is connected to a compressor which supplies an oxidizing agent gas to a fuel-cell stack. Thus, the electric power required for driving an electric motor which turns the turbine can be reduced.

In the foregoing fuel cell system, the supply of the oxidizing agent gas to the reforming device is established by another turbine driven by an electric motor. Thus there is a need to reduce the electric power consumed by this electric motor as well.

SUMMARY OF THE INVENTION

It is, therefore, a primary object of the present invention to provide a fuel cell system which meets such a need.

In order to attain the foregoing and other objects, a first aspect of the present invention provides a fuel cell system which comprises a fuel-cell stack which generates electric power by utilizing a fuel gas and an oxidizing agent gas; a combustion device which bums an off gas of the fuel gas emitted from the fuel-cell stack; an oxidizing agent gas supply device including a turbine and a compressor, the turbine being rotated by combustion energy of a gas exhausted from the combustion device, the compressor being coupled to the turbine to pressurize the oxidizing agent gas, the oxidizing agent gas supply device being connected to the fuel-cell stack for supplying the pressurized oxidizing agent gas; a reforming device which reforms a carbon hydride family fuel into the fuel gas; and oxidizing agent gas pressurizing means for further pressurizing the pressurized oxidizing agent gas, the oxidizing agent gas pressurizing means being connected between the reforming device and the fuel-cell stack.

A second aspect of the present invention provides a modification of a fuel cell system according to the first aspect of the present invention in such a manner that the reforming device includes a reforming portion which reforms the carbon hydride family fuel into the fuel gas and a CO-reducing device which reduces a CO component in the fuel gas, the reforming portion and the CO-reducing portion of the reforming device being connected to the oxidizing agent gas pressurizing means by way of flow rate control means.

A third aspect of the present invention provides a modification of a fuel cell system according to the second aspect of the present invention in such a manner that the flow rate control means is in the form of a three-way valve.

A fourth aspect of the present invention provides a modification of a fuel cell system according to the second aspect of the present invention in such a manner the flow rate control means is in the form of two flow rate control vales.

A fifth aspect of the present invention provides a modification of a fuel cell system according to the first aspect of the present invention in such a manner that the oxidizing agent gas pressurizing means is in the form of two oxidizing agent gas pressurizing devices, the reforming device includes a reforming portion which reforms the carbon hydride family fuel into the fuel gas and a CO-reducing device which reduces CO component in the fuel gas, the reforming portion and the CO-reducing portion of the reforming device being connected to the oxidizing agent gas pressurizing devices, respectively.

A sixth aspect of the present invention provides a modification of a fuel cell system according to the first aspect of the present invention in such a manner that the fuel cell system further comprises a gauge which determines a pressure difference between oxidizing agent gas and the fuel gas which are to be supplied to the fuel-cell stack.

In accordance with the first aspect of the present invention, since the oxidizing agent gas to be supplied to the reforming device from the oxidizing gas supply device has been further pressurized, a balanced pressure condition can be established between the fuel gas and the oxidizing agent gas which are to be supplied to the fuel-cell stack, which improves the durability of the solid state polymer electrolyte membrane and prevents supplying the oxidizing agent gas to the combusting device, with the result that the supply of the oxidizing agent gas to both the fuel-cell stack and the reforming device from the oxidizing agent gas supply device becomes possible, thereby reducing the electric power consumed in the fuel cell system.

In accordance with the second aspect of the present invention, the flow rate of the oxidizing agent gas supplied to the reforming portion of the reforming device and the flow rate of the oxidizing agent gas supplied to the CO-reducing portion of the reforming device can be adjusted or varied independently, which makes it possible to separately adjust the flow rate of the oxidizing agent gas supplied to each of the reforming portion and the CO-reducing portion of the reforming device.

In accordance with the third aspect of the present invention, a three-way valve is employed as the flow control means. The three-way valve is commercially available and is simple in construction, which makes it possible to independently control the flow rate in an easy way.

In accordance with the fourth aspect of the present invention, two flow rate control valves are employed as the flow control means. Such valves are commercially available and are simple in construction, which makes it possible to easily provide independent flow rate control.

In accordance with the fifth aspect of the present invention, the flow rate of the oxidizing agent gas supplied to the reforming portion of the reforming device and the flow rate of the oxidizing agent gas supplied to the CO-reducing portion of the reforming device can be adjusted or varied independently by the two oxidizing agent gas pressuring devices, which makes it possible to independently adjust the flow rate of the oxidizing agent gas supplied to each of the reforming portion and the CO-reducing portion of the reforming device.

In accordance with the sixth aspect of the present invention, the pressure differential gauge determines the pressure difference between the oxidizing agent gas and the fuel gas, which makes it possible to establish suitable control of each of the oxidizing agent gas supply device, the oxidizing agent gas pressurizing device and the flow rate control means.

According to the present invention, problems can be solved which occur when the oxidizing agent gas is fed from the common oxidizing agent gas supply device to both the reforming device and the fuel-cell stack. Due to the fact that the pressure of the fuel gas generated at the reforming device depends on the pressure of the oxidizing agent gas which is supplied to the reforming device, upon employment of the foregoing common oxidizing agent gas supply device, a pressure difference exists between the oxidizing agent gas supplied directly from the oxidizing agent gas supply device to the fuel-cell stack and the oxidizing agent gas supplied indirectly via the reforming device from the oxidizing agent gas supply device to the fuel-cell stack.

A pressure difference also results from the pressure loss of the oxidizing agent gas in the reforming device. If the foregoing pressure difference is too large, the solid-state polymer electrolyte membrane is applied with excess stress, which causes a serious durability problem. If the oxidizing agent gas supply device is driven by the turbine, the off gases of both the oxidizing agent gas and the fuel gas are combusted in the combusting device. When the oxidizing agent gas is supplied from the oxidizing agent gas supply device to the fuel-cell stack while leaving its pressure unchanged and the off gas of the oxidizing agent gas is supplied to the combusting device, the resultant burning or combustion pressure becomes high, the amount of power or energy recovered by the turbine is increased.

However, as previously explained, due to the pressure loss at the reforming device, the pressure of the off gas of the fuel gas becomes correspondingly low when supplied to the fuel-cell stack, so that the off gas of the fuel gas will not reach the combusting device in which the pressure of the oxidizing agent gas is higher than the pressure of the off gas of the fuel gas. Furthermore, the oxidizing agent gas can move toward the fuel electrode side of the fuel-cell stack by reverse flow through the conduit which is used to the supply of the off gas of the fuel gas to the fuel-cell stack.

In view of the foregoing circumstances, for establishment of a balanced pressure condition which allows the off gas of the fuel gas to be supplied into the combusting device, it is necessary to equalize the pressure of the oxidizing agent gas and the pressure of the fuel gas which are to be supplied to the combusting device by providing a throttle valve in the conduit through which the oxidizing agent gas moves to the combusting device. However, this increases the flow resistance in the conduit, which decreases the discharged amount of the oxidizing agent gas from the oxidizing agent gas supply device.

In order to solve such a problem, the invention further pressurizes the fuel gas by increasing the pressure of the oxidizing agent gas inputted into the reforming device. Thus, the oxidizing agent gas to be supplied to the reforming device is obtained by using the conduit which branches from the oxidizing agent gas supply device for the fuel-cell stack and the resultant conduit is provided therein with an oxidizing agent gas pressurizing device which increases the oxidizing agent gas pressure by a desired amount before being supplied to the reforming device.

Thus, the pressure balance in the gas supply system is solved and the flow rate control or adjustment of the oxidizing agent gas which is to flow into the reforming device becomes easier. In addition, the oxidizing agent gas pressurizing device does not need to pressurize oxidizing agent gas or air at atmospheric pressure but further pressurizes the already pressurized oxidizing agent by approximately 0.5 kgf/cm$^2$, which does not require as much electric power.

BRIEF DESCRIPTION OF THE DRAWINGS

These and other features and advantages of the present invention will be more readily apprehended from the following detailed description when read in connection with the appended drawing, which form a part of this original disclosure, and wherein.

DETAILED DESCRIPTION OF THE INVENTION

Figure 1:
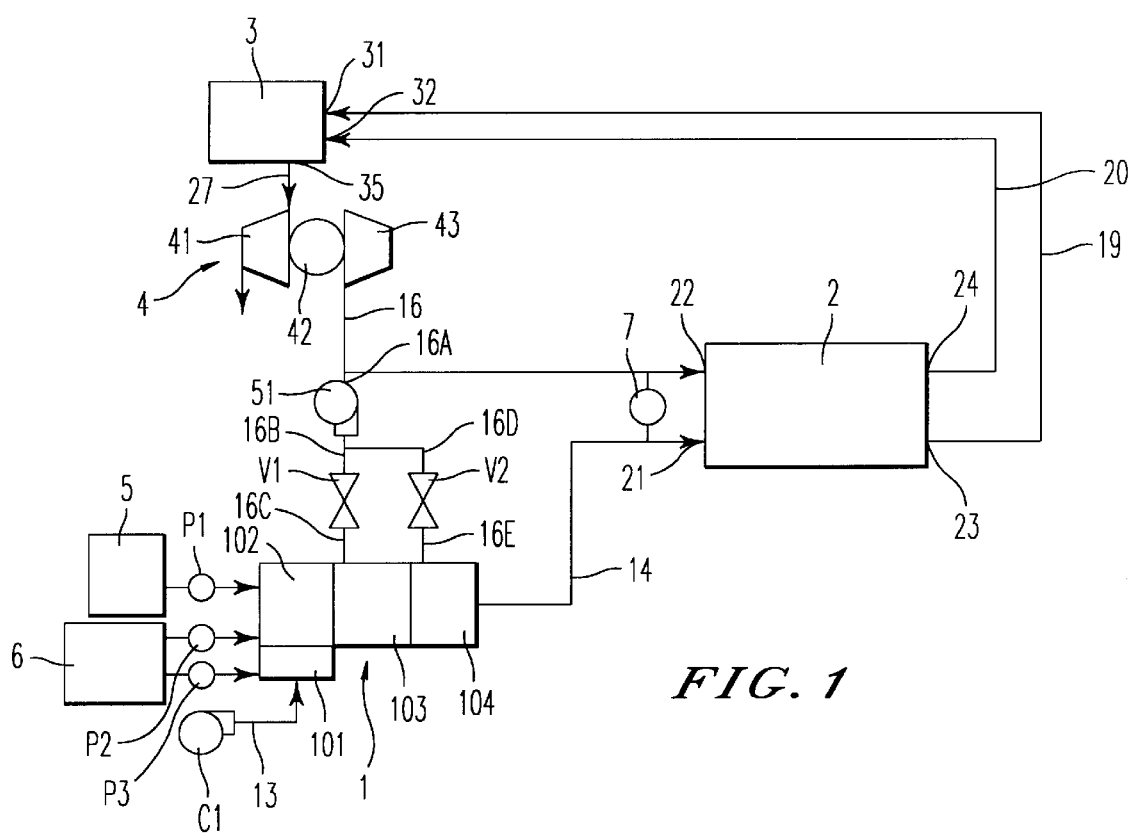
FIG. 1 is a schematic diagram of a solid-state polymer electrolyte type fuel cell system in accordance with a first embodiment of the present invention.

Referring now to drawings, wherein like reference numerals designate identical, equivalent, or corresponding parts throughout the several views, an explanation will be given of embodiments in accordance with the invention.

First Embodiment

FIG. 1 illustrates a solid-state polymer electrolyte type fuel cell system in accordance with a first embodiment of the present invention, in which air and a methanol-reformed fuel gas are used as an oxidizing agent gas and a fuel gas, respectively.

The solid-state polymer electrolyte type fuel cell system includes a reforming device 1, a fuel-cell stack 2, a combusting device 3, a turbo-assisted compressor 4 as an oxidizing agent gas supply device, and a compressor 51 as a device for further pressurizing the oxidizing agent gas. The solid-state polymer electrolyte type fuel cell system is also provided with a water tank 5 in which an amount of water is stored, a methanol tank 6 in which an amount of methanol is stored, a flow rate control valve V1 as a flow rate control means, a flow rate control valve V2 as another flow rate control means, a differential pressure sensor or gauge 7 as a pressure difference indicating means, and other various elements such as pipes and pumps.

The reforming device 1 is a device for converting the water and the methanol as fuels, respectively, through reforming, into a fuel gas which contains an amount of hydrogen as its main component or principal element. The reforming device 1 is made up of a burning portion 101, an evaporating portion 102, a reforming portion 103, and a CO-reducing portion 104. The burning portion 101 of the reforming device 1 is connected to the methanol tank 6 and an air compressor C1 by way of a methanol pump P3 and an air passage or conduit 13, respectively. The evaporating portion 102 of the reforming device 1 is connected to the water tank 5 and the methanol tank 6 by way of a water pump P1 and a methanol pump P2, respectively.

The turbo-assisted compressor 4 is constituted by a turbine 41, an electrically operated motor 42 and a compressor 43. While the combusting device 3 is in operation, the resultant exhaust gas is used to drive or rotate the turbine 41, with the result that the compressor 43 is turned on or driven. The electric motor 42 drives the compressor 43 only when the exhaust gas is of insufficient energy, for example upon an initiation of the fuel cell system.

The compressor 43 is designed to compress air which is employed as an oxidizing agent gas, and the resultant air is supplied to an air inlet port 22 of the fuel-cell stack 2. The compressor 43 is also connected to the compressor 51 by way of a conduit 16a which is branched from conduit 16.

The compressor 51 is connected to the flow rate control valve V1 by way of the air conduit 16b. The flow rate control valve V1 is connected to the reforming portion 103 of the reforming portion 103 by way of the air conduit 16c. In addition, the compressor 51 is connected to the fluid control valve V2 by way of an air conduit 16d which is branched from the air conduit 16b. The flow rate control valve V2 is connected to the CO-reducing portion 104 of the reforming device 1 by way of an air conduit 16e. The CO-reducing portion 104 is connected to a fuel gas inlet port 21 of the fuel-cell stack 2.

The differential pressure gauge 7 is arranged to determine a pressure difference between the fuel gas and the air, both of which are to be supplied to the fuel-cell stack 2. The differential pressure gauge 7 is connected between a portion of the fuel gas conduit 14 which is near the fuel gas inlet port 21 of the fuel-cell stack 2 and a portion of the air conduit 16 which is near the air inlet port 22 of the fuel-cell stack 2. Pressure detecting sensors provided in the respective fuel gas conduit 14 and the air conduit 16, and an apparatus calculating a difference between the measured pressures in the respective sensors, could instead be used.

The fuel-cell stack 2 is provided with an off gas exhaust port 23 from which an off gas is exhausted. The off gas exhaust port 23 is connected to an off gas supply port 31 of the combusting device 3 by way of a fuel off gas conduit 19. An air off gas exhaust port 24 of the fuel cell 2 is connected, by way of a cathode off-gas conduit 20, to an air off gas supply port 32 of the combusting device 3.

The combusting device 3 burns or combusts the fuel gas by using the air off gas as a combustion agent. The combusting device 3 is provided with an exhaust gas port 35 from which an exhaust gas is emitted, and which is connected to the turbine 41 of the turbo-assisted compressor 4 by way of an exhaust gas conduit 27.

In operation, when the fuel cell system is first turned on, the methanol pump P3 is driven to supply the methanol from the methanol tank 6 to the burning portion 101 of the reforming device 1. The motor 42 of the turbo-assist compressor 4 is also turned on to drive the compressor 43. Simultaneously, the air compressor C1 is turned on. The methanol supplied to the burning portion 101 of the reforming device 1 is burned with assistance of the air which acts as a combustion agent, with the result that the evaporating portion 102 of the reformer 1 is warmed up to a predetermined temperature.

The water pump P1 supplies water from the water tank 5 to the evaporating portion 102 of the reforming device 1, while the methanol pump P2 supplies the methanol from the methanol tank 6 to the evaporating portion 102 of the reforming device 1. The resultant water and methanol are fed to the reforming portion 103 after being evaporated in the evaporating portion 102.

The compressor 43 of the turbo-assisted compressor 4 supplies air to the air inlet port 22 of the fuel-cell stack 2 by way of the air conduit 16. Simultaneously, the compressor 43 supplies air to the compressor 51 by way of the air conduit 16a. The resultant air is further pressurized in the compressor 51. The air under pressure is supplied from the compressor 51 to the reforming portion 103 of the reforming device 1 by way of the air passage 16b, the flow rate control valve V1, and the air conduit 16c. In parallel, the air under pressure is supplied from the compressor 51 to the CO-reducing portion 104 of the reforming device 1 by way of the air conduit 16b, the air conduit 16d, the flow rate control valve V2 and the air is passage 16e.

In the reforming portion 103 of the reforming device 1, the water and the methanol which are in gas phase or evaporated condition are mixed with the air supplied from the compressor 51, thereby being converted into a fuel gas containing hydrogen as its main component according to the following chemical reaction which is promoted by a reforming catalyst such as Pd-catalyst or Cu—Zn catalyst.

$$CH_3OH+0.13O_2+0.47N_2+0.75H_2O \rightarrow 2.75H_2+CO_2+0.47N_2$$

The resultant fuel gas, which contains CO at a rate ranging from 0.5 to 1%, is fed to the CO-reducing portion 104 of the reforming device 1. In the CO-reducing portion 104 of the reforming device 1, such CO is oxidized into $CO_2$ by the air supplied from the compressor 51 in the presence of a CO-reducing catalyst, say a Pt-catalyst, thereby decreasing the CO concentration to be less than or equal to a value of 10 ppm. The resultant or CO-reduced fuel gas is fed to the fuel gas supply port 21 of the fuel-cell stack 2.

The fuel-cell stack 2 includes a plurality of stacked cells (not shown), as is well known. Each cell is so constructed as to sandwich a solid-state polymer electrolyte membrane between a fuel electrode and an oxidizing electrode (none are shown). At the fuel electrode, contacting the hydrogen gas in the fuel gas with the catalyst causes the following chemical reaction.

$$2H_2 \rightarrow 4H^+ + 4e^-$$

The $H^+$ or plus ion of hydrogen passes through the solid-state polymer electrolyte membrane, reaches the oxidizing catalyst, and reacts with oxygen in ambient air which results in the generation of water, thereby generating electric power. Such a reaction is expressed by the following formula.

$$4H^+ + 4e^- + 2H_2 \rightarrow 2H_2O$$

In the fuel-cell stack 2, the hydrogen contained in the fuel gas is not utilized at a rate of 100% but about 80%. The remaining hydrogen or hydrogen which has not been utilized or consumed is fed to the fuel gas supply port 31 of the combusting device 3 by way of the fuel gas off gas conduit 19.

On the other hand, the fuel-cell stack 2 is supplied with excess air, with the result that air off gas is exhausted from the air off gas exhaust port 24. The air off gas is then fed to the air supply port 32 of the combusting device 3.

In the combusting device 3, the off gases of the respective fuel gas and air are burned or combusted. The resultant exhaust gas emitted from the combusting device 3 is fed to the turbine 41 of the turbo-assist compressor 4, thereby driving the turbine 41. This causes the compressor 43 to operate, with the result that the load of the motor 42 is reduced, thereby saving electric energy required to drive the motor 42. When the fuel cell system is in steady operation, the combustion of the off gas of the fuel gas has a sufficient energy that the motor 42 need not operate. This is advantageous for a vehicle-mounting fuel cell system since the auxiliary electric power source can have a small capacity.

In this first embodiment, the pressure of the air which is exhausted from the compressor 43 is set to be 3 atm. Almost 3 atm pressure air is supplied to the air supply port 22 of the fuel-cell stack 2. It is further compressed to 3.5 atm by the compressor 51 and supplied to the reforming portion 103 and the CO reducing portion 104 of the reforming device 1, and is exhausted therefrom as the fuel gas. The pressure of the fuel gas exhausted from the reforming device 1 depends on the pressure of the air supplied to the reforming portion 103 and the CO reducing portion 104 of the reforming device 1. Due to the pressure loss in the reforming device 1, the pressure of the fuel gas falls to 3.2 atm which is slightly less than the pressure of the air supplied to the reforming portion 103 and the CO reducing portion 104 of the reforming device 1.

Thus, the pressure of the fuel gas which is supplied to the fuel gas supply port 21 of the fuel-cell stack 2 becomes 3.2 atm which is slightly higher than the pressure of the air which is supplied to the air supply port 22 of the fuel-cell stack 2. Due to the fact in the fuel-cell stack 2 the pressure loss of fuel gas is almost as same as the pressure loss of the air, the fuel gas and the air fed to the combusting device 3 have the same pressure difference. Thus, the fuel gas can be supplied to the combusting device 3 without fear of backward movement of air in the off gas of fuel gas conduit 19.

If a pressure difference becomes too large between the fuel gas and the air, both of which are supplied to the fuel-cell stack 2, the stress applied to the solid-state polymer electrolyte membranes becomes large, which causes a serious durability problem. By contrast, if such a pressure is too small, the fuel gas may not be sufficiently supplied to the combusting device 3. In order to maintain a correct pressure difference, the pressurizing function of the compressor 51 is adjusted on the basis of the reading the differential pressure sensor 2.

As explained above, when the solid-state polymer electrolyte fuel system is in steady operation, the turbo-assisted compressor 4 is driven only by the energy derived from the combusting device 3, and no electric power is required to operate the turbo-assisted compressor 4. In addition, the compressor 51 pressurizes the air from the turbo-assisted compressor 4 by a very small amount, say, 0.5 kgf/cm$^2$ in the present embodiment. Assuming that a dedicated separate compressor which is driven by its own electric power source is employed for air supply to the reforming device 1, such a dedicated compressor need only pressurize air from atmospheric pressure to 3.5 atm. Thus, the compressor 51 will consume much less electric power.

It is to be noted that required amounts of air to be supplied to the reforming portion 103 and the CO-reducing portion 104 of the reforming device 1 is controlled by way of the respective flow rate control valves V1 and V2.

Second Embodiment

Figure 2:
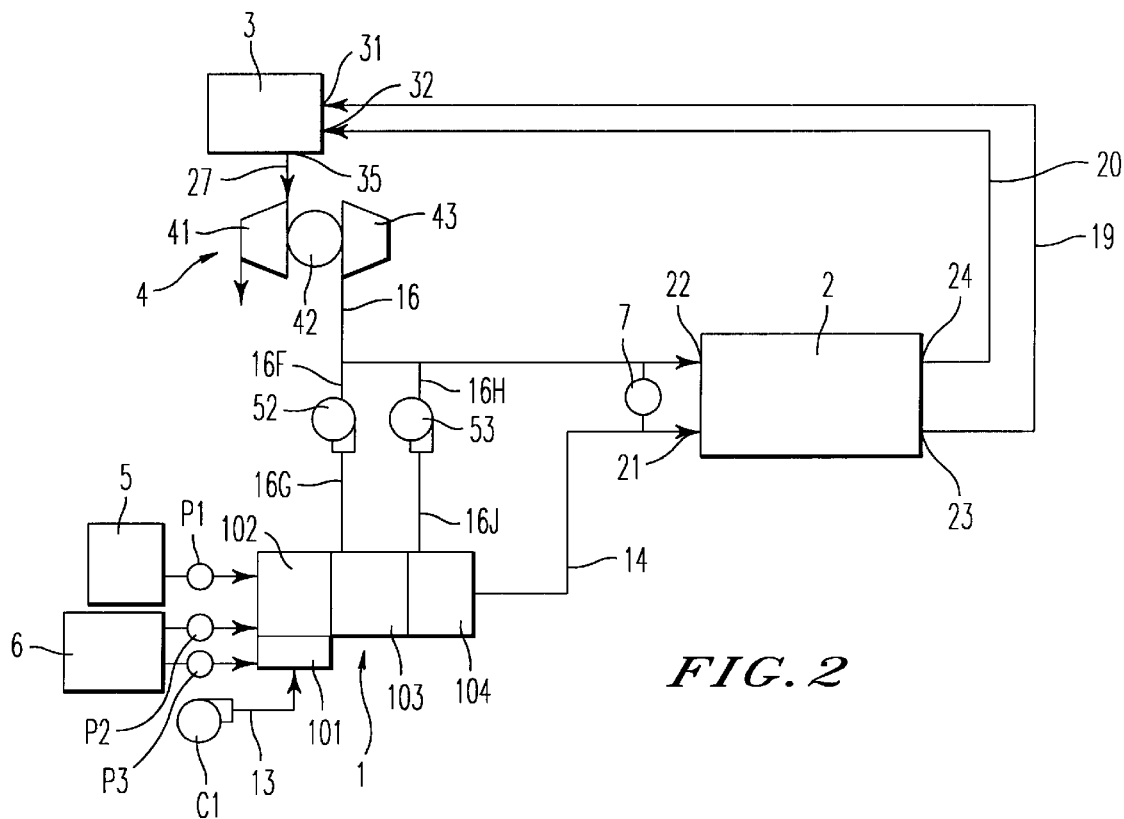
FIG. 2 is a schematic diagram of a solid-state polymer electrolyte type fuel cell system in accordance with a second embodiment of the present invention.

With reference to FIG. 2, there is illustrated a solid-state polymer electrolyte type fuel cell system in accordance with a second embodiment of the present invention. The first embodiment and the second embodiment are identical except that in the latter the reforming portion and CO reducing portion of the reforming device are supplied with air from two independent compressors instead of a common compressor. Elements or members corresponding to those shown in FIG. 1 have corresponding reference numerals or symbols.

In the second embodiment, as the oxidizing agent pressurizing means, two independent compressors 52 and 53 are provided. The compressor 43 of the turbo-assisted compressor 4 is connected to the compressor 52 by way of an air conduit 16f which is branched from the air conduit 16. The compressor 52 is also connected to the reforming portion 103 of the reforming device 1 by way of an air conduit 16g. The compressor 43 of the turbo-assisted compressor 4 is connected to the compressor 53 by way of an air conduit 16h which is branched from the air conduit 16. The compressor 53 is also connected to the CO-reducing portion 104 of the reforming device 1 by way of an air conduit 16j.

In the second embodiment, the pressure of the air which is exhausted from the compressor 43 is set to be 3 atm. The air having a pressure of about 3 atm is supplied to the air supply port 22 of the fuel-cell stack 2. The air which is supplied from the compressor 43 to the respective compressors 52 and 53 is pressurized to about 3.5 atm.

The resultant compressed air is supplied to the reforming portion 103 and the CO reducing portion 104 of the reforming device 1, respectively, and the fuel gas is exhausted therefrom. The pressure of the fuel gas exhausted from the reforming device 1 depends on the pressure of the air supplied to the reforming portion 103 and the CO reducing portion 104 of the reforming device 1. Due to the pressure loss in the reforming device 1, the pressure of the fuel gas becomes 3.2 atm which is slightly smaller than the pressure of the air supplied to the reforming portion 103 and the CO reducing portion 104 of the reforming device 1.

Thus, the pressure of the fuel gas which is supplied to the fuel gas supply port 21 of the fuel-cell stack 2 becomes 3.2 atm which is slightly higher than the pressure of the air which is supplied to the air supply port 22 of the fuel-cell stack 2. Due to the fact that the pressure loss of fuel gas is almost the same as the pressure loss of the air in the fuel-cell stack 2, the pressure difference remains unchanged between the fuel gas and the air fed to the combusting device 3. Thus, the fuel gas can be supplied to the combusting device 3 without fear of backward or reverse movement of air in the off gas of the fuel gas conduit 19.

If the pressure difference becomes too large between the fuel gas and the air which are supplied to the fuel-cell stack 2, the stress applied to the solid-state polymer electrolyte membranes becomes large, which causes a serious durability problem. By contrast, if such a pressure is too small, too little fuel gas will be supplied to the combusting device 3. In order to ensure a correct pressure difference, the pressurizing function of the compressors 52 and 53 is set to be adjusted on the basis of the reading the differential pressure gauge 7.

As explained above, when the fuel system is in steady operation, the turbo-assisted compressor 4 is driven only by the energy derived from the combusting device 3, and so no electric power is required to operate the turbo-assisted compressor 4. In addition, each of the compressors 52 and 53 is required to pressurize the air from the turbo-assisted compressor 4 by a very small amount, say 0.5 kgf/cm$^2$ in the present embodiment. If a dedicated or separate compressor which is driven by its own electric power source is employed for air supply to the reforming device 1, such a dedicated compressor must pressurize air from atmospheric pressure to 3.5 atm. Thus, the compressors 52 and 53 can consume less electric power than a dedicated compressor. The compressors 52 and 53 can individually adjust the amount of air to be supplied to the respective reforming portion 103 and CO-reducing portion 104 of the reforming device 1, which makes it possible to omit the flow rate control valves required in the first embodiment.

Third Embodiment

Figure 3:
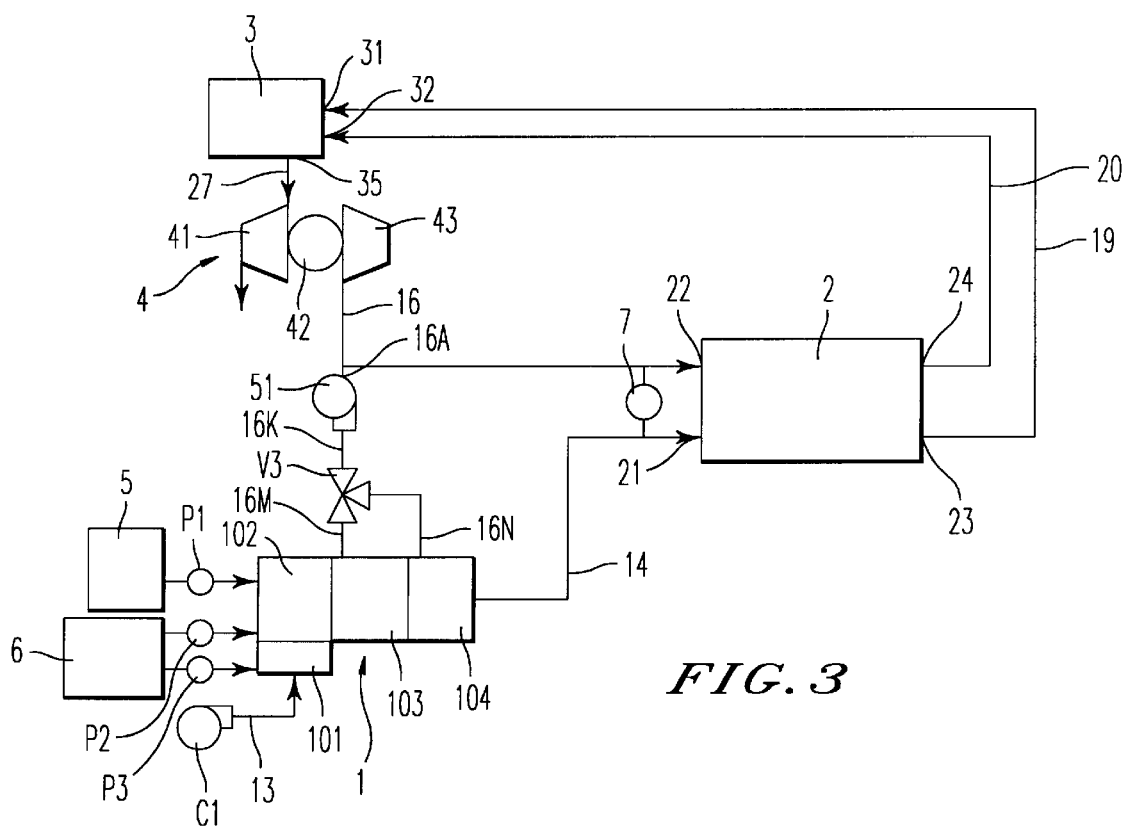
FIG. 3 is a schematic diagram of a solid-state polymer electrolyte type fuel cell system in accordance with a third embodiment of the present invention.

With reference to FIG. 3, there is illustrated a solid-state polymer electrolyte type fuel cell system in accordance with a third embodiment of the present invention. The third embodiment and the first embodiment are identical in structure except that in the former a three-way valve is used as flow rate control means, instead of the flow rate control valves V1 and V2 in the latter. Elements corresponding to those shown in FIG. 1 have corresponding reference numerals or symbols.

In the third embodiment, the compressor 51, as an oxidizing agent gas pressurizing means, is connected to an inlet port of the three-way valve V3 by way of an air conduit 16k. Outlet ports of the three-way valve V3 are connected to the reforming portion 103 and the CO-reducing portion 104 of the reforming device 1, by way of air conduits 16m and 16n, respectively.

In this embodiment, the pressure of the air which is exhausted from the compressor 43 is set to 3 atm. The air having a pressure of about 3 atm is supplied to the air supply port 22 of the fuel-cell stack 2. The air which is supplied from the compressor 43 to the compressor 51 is pressurized to about 3.5 atm.

The resultant or pressure-increased gas is supplied to the reforming portion 103 and the CO reducing portion 104 of the reforming device 1, respectively, and the fuel gas is exhausted therefrom. The pressure of the fuel gas exhausted from the reforming device 1 depends on the pressure of the air supplied to the reforming portion 103 and the CO-reducing portion 104 of the reforming device 1. Due to the pressure loss in the reforming device 1, the pressure of the fuel gas becomes 3.2 atm which is slightly smaller than the pressure of the air supplied to the reforming portion 103 and the CO reducing portion 104 of the reforming device 1.

Thus, the pressure of the fuel gas which is supplied to the fuel gas supply port 21 of the fuel-cell stack 2 becomes 3.2 atm which is slightly higher than the pressure of the air which is supplied to the air supply port 22 of the fuel-cell stack 2. Due to the fact in the fuel-cell stack 2 the pressure loss of fuel gas is almost the same as the pressure loss of the air, the pressure difference remains unchanged for the fuel gas and the air fed to the combusting device 3. Thus, the fuel gas can be supplied to the combusting device 3 without fear of backward movement of air in the off gas of fuel gas conduit 19.

If a pressure difference becomes too large between the fuel gas and the air supplied to the fuel-cell stack 2, the stress applied to each of the solid-state polymer electrolyte membranes becomes large, which causes a serious durability problem. By contrast, if such a pressure difference is too small, insufficient fuel gas may be supplied to the combusting device 3. In order to ensure a correct pressure difference, the pressurizing function of the compressor 51 is adjusted on the basis of the reading the differential pressure gauge 7.

As explained above, while the fuel system is in steady operation, the turbo-assisted compressor 4 is driven only by the energy derived from the combusting device 3, which requires no electric power to operate the turbo-assisted compressor 4. In addition, the compressor 51 must pressurize the air from the turbo-assisted compressor 4 by a very small amount, say 0.5 kgf/cm² in the present embodiment. If a dedicated compressor which is driven by its own electric power source is employed for air supply to the reforming device 1, such dedicated compressor must pressurize the air from atmospheric pressure to 3.5 atm. Thus, the compressor 51 may consume less power than a dedicated compressor. The three-way valve V3 serves for adjusting independently the amount of air to be supplied to the reforming portion 103 and the CO-reducing portion 104 of the reforming device 1.

The invention has thus been shown and description with reference to specific embodiments, however it should be understood that the invention is in no way limited to the details of the illustrated structures but changes and modifications may be made without departing from the scope of the appended claims.

What is claimed is:

1. A fuel cell system comprising:
   a fuel-cell stack which generates an electric power by utilizing a fuel gas and an oxidizing agent gas;
   a combusting device which receives an off gas of the fuel gas emitted from the fuel-cell stack;
   an oxidizing agent gas supply device including a turbine and a compressor, the turbine receiving and being driven by an exhaust gas from the combusting device, the compressor being connected to the fuel-cell stack for supplying a pressurized oxidizing agent gas thereto;
   a carbon hydride family fuel reforming device connected for supplying a reformed carbon hydride family fuel to the fuel cell stack; and
   oxidizing agent gas pressurizing means for further pressurizing a pressurized oxidizing agent gas from the oxidizing agent gas supply device and for supplying the further pressurized oxidizing agent gas to the carbon hydride family fuel reforming device,
   wherein the oxidizing agent gas pressurizing means comprises two oxidizing agent gas pressurizing devices, wherein the reforming device includes a reforming portion which reforms the carbon hydride family fuel into the fuel gas and a CO-reducing device which reduces a CO component in the reformed fuel gas, and wherein each of the reforming portion and the CO-reducing portion of the reforming device is connected to one of the oxidizing agent gas pressurizing devices, respectively.

2. A fuel cell system as set forth in claim 1, wherein both the reforming portion and the CO-reducing portion of the reforming device are connected to the oxidizing agent gas pressurizing means by way of flow rate control means.

3. A fuel cell system as set forth in claim 2, wherein the flow rate control means comprises two flow rate control valves.

4. A fuel cell system as set forth in claim 2 further comprising a differential pressure gauge which detects a pressure difference between oxidizing agent gas and the fuel gas which are being supplied to the fuel-cell stack.

5. A fuel cell system as set forth in claim 4, wherein the flow rate control means is regulated with reference to the differential pressure gauge.

6. A fuel cell system comprising:
   a fuel-cell stack which generates electric power by utilizing a fuel gas and an oxidizing agent gas;
   a combusting device which receives an off gas of the fuel gas emitted from the fuel-cell stack;
   an oxidizing agent gas supply device including a turbine and a compressor, the turbine receiving and being driven by an exhaust gas from the combusting device, the compressor being connected to the fuel-cell stack for supplying a pressurized oxidizing agent gas thereto;
   a carbon hydride family fuel reforming device connected for supplying a reformed carbon hydride family fuel to the fuel cell stack;
   measuring means for measuring a pressure difference between the pressurized oxidizing agent gas and the reformed carbon hydride family fuel which are supplied to the fuel cell stack; and
   oxidizing agent gas pressurizing means for further pressurizing a pressurized oxidizing agent gas from the oxidizing agent gas supply device, the oxidizing agent gas pressurizing means being operable to supply the further pressurized oxidizing agent gas to the reforming device on the basis of a pressure difference measured by said measuring means.

7. A fuel cell system as set forth in claim 6, wherein the reforming device includes a reforming portion which reforms the carbon hydride family fuel and a CO-reducing portion which reduces a CO component in the reformed fuel gas, wherein both the reforming portion and the CO-reducing portion of the reforming device are connected to the oxidizing agent gas pressurizing means by way of flow rate control means.

8. A fuel cell system as set forth in claim 7, wherein the flow rate control means comprises a three-way valve.

9. A fuel cell system as set forth in claim 7, wherein the flow rate control means comprises two flow rate control valves.

10. A fuel cell system as set forth in claim 6, wherein the oxidizing agent gas pressurizing means comprises two oxidizing agent gas pressurizing devices, wherein the reforming device includes a reforming portion which reforms the carbon hydride family fuel into the fuel gas and a CO-reducing device which reduces a CO component in the reformed fuel gas, and wherein each of the reforming portion and the CO-reducing portion of the reforming device is connected to one of the oxidizing agent gas pressurizing devices, respectively.

* * * * *